United States Patent
Kovacs et al.

(10) Patent No.: US 7,531,033 B2
(45) Date of Patent: May 12, 2009

(54) PRE-TREATMENT COMPOSITIONS, OIL-BASED INK COMPOSITIONS, AND PROCESSES FOR INK-JET RECORDING USING PRE-TREATMENT COMPOSITIONS AND OIL-BASED INK COMPOSITIONS

(75) Inventors: Gregory J. Kovacs, Webster, NY (US); Marcel P. Breton, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 618 days.

(21) Appl. No.: 11/289,573

(22) Filed: Nov. 30, 2005

(65) Prior Publication Data

US 2007/0119339 A1    May 31, 2007

(51) Int. Cl.
*C09D 11/02*    (2006.01)

(52) U.S. Cl. .............. 106/31.34; 106/31.86; 106/31.58; 106/31.66; 106/31.35; 106/31.67; 106/31.43; 106/31.75

(58) Field of Classification Search .............. 106/31.58, 106/31.86, 31.34, 31.66, 31.35, 31.67, 31.43, 106/31.75
See application file for complete search history.

(56) References Cited

U.S. PATENT DOCUMENTS

| | | | |
|---|---|---|---|
| 4,476,210 A | 10/1984 | Croucher et al. | |
| 5,989,325 A | 11/1999 | Sacripante et al. | |
| 6,412,935 B1 | 7/2002 | Doumaux | |
| 6,529,225 B1 | 3/2003 | Shiraiwa et al. | |
| 6,561,644 B2 | 5/2003 | Romano, Jr. et al. | |
| 6,630,153 B2 | 10/2003 | Long et al. | |
| 6,655,797 B2 | 12/2003 | Smith et al. | |
| 6,692,881 B2 | 2/2004 | Tsubuko et al. | |
| 6,854,823 B2 | 2/2005 | Rutland et al. | |
| 2003/0067527 A1 | 4/2003 | Temple | |
| 2003/0202026 A1 | 10/2003 | Smith et al. | |
| 2003/0202039 A1 | 10/2003 | Rutland et al. | |
| 2004/0006158 A1 | 1/2004 | Horie et al. | |
| 2004/0017409 A1 | 1/2004 | Mizutani et al. | |
| 2004/0056940 A1 | 3/2004 | Rutland et al. | |
| 2004/0068031 A1 | 4/2004 | Horie et al. | |
| 2004/0104987 A1 | 6/2004 | Smith et al. | |
| 2005/0078129 A1 | 4/2005 | Ahlvin et al. | |

FOREIGN PATENT DOCUMENTS

| | | |
|---|---|---|
| EP | 0 134 727 A1 | 3/1985 |
| EP | 1 155 866 A2 | 11/2001 |
| EP | 1 393 924 A2 | 3/2004 |
| EP | 1 524 125 A1 | 4/2005 |
| JP | A 2005-007577 | 1/2000 |
| JP | A 2002-144551 | 5/2002 |
| JP | A 2002-235029 | 8/2002 |
| JP | A 2003-35043 | 2/2003 |
| JP | A 2003-53942 | 2/2003 |
| JP | A 2003-292880 | 10/2003 |
| JP | A 2004-230759 | 8/2004 |
| JP | A 2004-262232 | 9/2004 |
| JP | A 2004-314350 | 11/2004 |
| WO | WO 00/30856 A1 | 6/2000 |
| WO | WO 01/84247 A1 | 11/2001 |

*Primary Examiner*—Jerry Lorengo
*Assistant Examiner*—Veronica Faison Gee
(74) *Attorney, Agent, or Firm*—Oliff & Berridge, PLC

(57) ABSTRACT

Pre-treatment compositions include organic liquids and cross-linking initiators. Pre-treatment compositions are included in ink sets that also include oil-based ink compositions. Oil-based ink compositions include organic liquids, unsaturated fatty materials having terminal polar functional groups, colorants, and metal salts. Methods for ink-jet printing use pre-treatment compositions and oil-based ink compositions.

18 Claims, No Drawings

PRE-TREATMENT COMPOSITIONS, OIL-BASED INK COMPOSITIONS, AND PROCESSES FOR INK-JET RECORDING USING PRE-TREATMENT COMPOSITIONS AND OIL-BASED INK COMPOSITIONS

BACKGROUND

The present disclosure relates in general to ink-jet recording. In particular, this disclosure relates to pre-treatment compositions, oil-based ink compositions, and methods for using pre-treatment compositions in ink-jet recording processes. The disclosed pre-treatment compositions and methods provide improved image quality.

Many liquid-ink compositions, and particularly those used in ink-jet recording, include a colorant, pigment or dye, and a liquid, which is typically an aqueous liquid vehicle, such as water, and/or a low vapor pressure solvent. The ink composition is deposited onto the substrate to form an image in the form of text and/or graphics. Once deposited, the liquid component is removed from the ink composition and the paper to fix the colorant to the substrate by either natural air-drying or by active drying.

Coated substrates and ink-jet recording media for use in ink-jet printers, in particular with non-aqueous pigmented ink compositions, are described, for example, in U.S. Patent Application Publication No. 2005/0078129, the disclosure of which is incorporated herein by reference in its entirety. This publication discloses methods of thermally sealing the overcoat of multilayer media. JP 2004 230759 A2 also discloses ink-jet recording media for non-aqueous pigmented ink compositions, in which a topcoat layer is composed mainly of inorganic ultra fine particles with an average particle size of less than 1 micron, and the undercoat layer is composed mainly of an alkaline earth metal salt as a pigment and a binder.

Ink-jet recording media using undercoat compositions, for use with aqueous ink compositions, are described in Japanese Patent Publication JP 2004 262232 A2, the disclosure of which is totally incorporated herein by reference. Ink-jet recording media using overcoat compositions, for use with aqueous ink compositions, are described in Japanese Patent Publications JP 2003 053942 A2 and JP 2002 144551 A2, the disclosures of which are totally incorporated herein by reference.

U.S. Patent Application Publication No. 2004/0104987, the disclosure of which is incorporated herein by reference in its entirety, describes ink-jet printing systems that include the deposition of fixers and overcoats, in which drops of fixer material and of overcoat material are deposited on previously deposited colored ink drops. In addition, smudge-resistant ink-jet printing systems using overcoat and fixer solutions are also described in U.S. Patent Application Publications Nos. 2004/0056940, 2003/0202039 and 2003/0202026, and in U.S. Pat. Nos. 6,854,823; 6,655,797; 6,412,935, the disclosures of which are incorporated herein by reference in their entirety. European Patent Publication EP 01155866 A2, the disclosure of which is incorporated herein by reference in its entirety, discloses methods of applying fixer fluid overcoats to porous or semi-porous ink-jet printed media.

Methods of ink-jet printing using UV curable undercoats are described, for example, in U.S. Patent Application Publication No. 2003/0067527 and in international patent application publication WO 0030856, the disclosures of which are incorporated herein by reference in their entirety. Ink-jet printers for use with UV curable ink compositions are described in Japanese Patent Publication JP 2005 007577 A2, the disclosure of which is incorporated herein by reference in its entirety. Compositions for photo-curable overcoat layers and printed matter are described in Japanese Patent Publication JP 2003 292880 A2, the disclosure of which is totally incorporated herein by reference.

Apparatus, methods and wax coatings for improved durability and visual appearance of printed images are described in international patent publication WO 00184247 A2, the disclosure of which is incorporated herein by reference in its entirety.

Image-receiving layer and overcoat layer compositions, which are cured using an active energy beam, for ink-jet recording are described in European Patent Publication EP 01348727 A2, the disclosure of which is incorporated herein by reference in its entirety.

U.S. Patent Application Publication No. 2004/0017409, the disclosure of which is incorporated herein by reference in its entirety, discloses ink-jet recording process and ink-jet recording apparatus in which protective coatings are formed on images by an overcoat device that uses heat transfer sheets.

Japanese Patent Publication JP 2004 314350 A2, the disclosure of which is totally incorporated herein by reference, describes methods for ink-jet recording and recorded articles in which a clear ink composition comprising polymer particulates is discharged onto a printed layer, the clear ink composition forms a liquid layer that is then heated to form an overcoat layer.

Ink-jet printers including overcoating printheads, positioned downstream from the ink-jet printheads, that provide coatings that are subsequently hardened over printed images are described in Japanese Patent Publication JP 2003 35043 A2, the disclosure of which is incorporated herein by reference in its entirety. Transparent protective overcoats for offset, ink-jet and xerographic images are described in Japanese Patent Publication JP 2002 235029 A2, the disclosure of which is incorporated herein by reference in its entirety.

Overcoat layers of water-dispersible, hydrophobic polyester resin are disclosed in U.S. Pat. No. 6,561,644, the disclosure of which is incorporated herein by reference in its entirety. Ink-jet processes for improving image durability and quality by overcoating ink-jet images with layers containing water-dispersible clay particles are described in European Patent Publication EP 01393924 A2, the disclosure of which is incorporated herein by reference in its entirety.

Printing methods and apparatus for forming protective layers on printed media by transferring protective agents while avoiding perforated portions of the media are disclosed in U.S. Pat. No. 6,529,225, the disclosure of which is incorporated herein by reference in its entirety.

European Patent Publication EP 01524125 A1, the disclosure of which is incorporated herein by reference in its entirety, discloses methods of thermally sealing overcoat layers of multilayer media, in which porous topcoats are heated to close the pores and provide protective layers between the inner ink-receiving layers and the environment.

While a number of compositions and processes, such as those described above, are known for undercoating images produced by ink-jet recording methods are known, particularly for aqueous ink compositions and photo-curable ink compositions, a need remains for curable pre-treatment compositions for oil-based ink compositions.

Oil-based liquid ink compositions include a colorant, pigment or dye, and an oil-based liquid. The ink composition is deposited on the substrate to form an image in the form of text and/or graphics. Such oil-based pigmented ink compositions can provide excellent image quality on specially coated papers, such as silica-coated papers. Silica coatings immobilize the colorant on contact, providing sharp images. For example, liquid ink-jet recording oil-based ink compositions, displaying satisfactory pigment dispersibility, are described in U.S. Pat. No. 6,630,153, the disclosure of which is incorporated herein by reference in its entirety.

Oil-based ink compositions for ink-jet printers and methods for their production have been described, for example, in U.S. Patent Application Publications Nos. 2004/0068031, 2004/0006158, the disclosures of which are incorporated herein by reference in its entirety, and in U.S. Pat. Nos. 6,692,881 and 5,989,325, the disclosures of which are incorporated herein by reference in its entirety.

However, images produced on plain paper using oil-based ink compositions do not generally have good image quality. Oils in the ink compositions spread laterally and vertically through pores in plain, untreated papers, and pigments in the ink compositions spread with the oils. Lateral pigment spread results in images having ragged edges. Vertical pigment spread results in image show-through.

Thus, there remains a need for improved oil-based compositions and methods for use in ink-jet recording that prevent pigment spread, particularly on plain paper.

SUMMARY

Aspects disclosed herein provide oil-based pre-treatment compositions for use in ink-jet recording using oil-based ink compositions. In particular, pre-treatment compositions including organic liquids and cross-linking initiators are provided.

Separately provided are oil-based ink compositions including organic liquids, unsaturated organic compounds, pigments, and metal salts. The unsaturated organic compounds may be chosen, in embodiments, from unsaturated fatty materials and unsaturated fatty materials having terminal polar groups.

Separately, ink sets including pre-treatment compositions, including organic liquids and cross-linking initiators, and oil-based ink compositions, including organic liquids, unsaturated organic compounds, colorants, and optional metal salts, are provided.

Ink-jet recording processes are separately provided, in which pre-treatment compositions that include organic liquids and cross-linking initiators are employed.

These and other features and advantages of various exemplary embodiments of materials, devices, systems and/or methods are described in or are apparent from, the following detailed description.

DETAILED DESCRIPTION OF EMBODIMENTS

This disclosure provides pre-treatment compositions for coating a substrate prior to generating images with oil-based pigmented ink compositions, in order to provide high quality images. Pre-treatment compositions that contain cross-linking initiators in an oil-based liquid vehicle can be provided by ink-jet recording methods onto a substrate. Then, oil-based ink compositions containing polar-functional group-terminated unsaturated fatty materials, colorants, and optionally catalytic drying agents, in an oil-based liquid vehicle, may be provided by ink-jet recording methods onto the pre-treated substrate. The cross-linking initiators in the pre-treatment compositions initiate cross-linking of the unsaturated fatty materials and immobilize colorants as the colorants are deposited onto the substrate surface to stop both lateral and vertical pigment spreading.

Pre-Treatment Compositions

Aspects described herein provide ink-jettable, oil-based pre-treatment compositions comprising organic liquids and cross-linking initiators.

Embodiments of pre-treatment compositions may comprise one or more organic liquids. The organic liquids fiction as oil-based liquid vehicles for the pre-treatment compositions of embodiments. Suitable organic liquids for use in embodiments include $C_6$-$C_{30}$ linear alkanes, such as those available under the trade name NORPAR from Exxon Corporation; $C_6$-$C_{30}$ branched alkanes, such as those available under the trade name ISOPAR from Exxon Corporation; $C_6$-$C_{30}$ linear alkenes and/or $C_6$-$C_{30}$ branched alkenes, and mixtures thereof. Other suitable organic liquids include, for example, the SOLTROL® series, available from the Phillips Petroleum Company, and the SHELLSOL® series, available from the Shell Oil Company can be selected. In embodiments, the organic liquids are chosen from solvents having a low vapor pressure at room temperature, in order to reduce smell and to meet environmental regulations in specific market applications. Specific examples of such suitable organic liquids include, but are not limited to, NORPAR® 12, 13, and 15, available from Exxon Corporation; ISOPAR® G, H, L, and M, available from Exxon Corporation; AMSCO 460 Solvent and AMSCO OMS, available from American Mineral Spirits Company; SOLTROL, available from Phillips Petroleum Company; PAGASOL, available from Mobil Oil Corporation; SHELLSOL, available from Shell Oil Company; and the like. In particular embodiments, the solvents are chosen from hydrocarbon solvents that are high-purity iso-paraffinic hydrocarbons having a boiling point in the range of from about 125° C. to about 350° C.

In addition, pre-treatment compositions of embodiments comprise one or more cross-linking initiators. These cross-linking initiators, once activated, initiate cross-linking of unsaturated materials, and thus provide a network in which colorants from ink compositions are immobilized. Suitable cross-linking initiators for use in embodiments have high solubility in non aqueous media, such as the above-mentioned organic liquids and in organic liquids of oil-based ink compositions; are stable at room temperature; and have high activation temperatures. In addition, suitable cross-linking initiators may, in embodiments, be readily activated under metal salt catalysis at ambient temperatures. In embodiments, the cross-linking initiators may be soluble in and/or compatible with oil-based ink compositions, such as those described below.

Any cross-linking initiator suitable for use in cross-linking unsaturated organic compounds may be used in accordance with embodiments. For example, embodiments of pre-treatment compositions may include one or more cross-linking initiator, such as thermally-activated initiators including peroxy compounds, hydroperoxy compounds and related initiators; azo compounds; photo-initiators including benzophenone, benzoin ethyl ether, and 2,2-dimethoxy-2-phenyl acetophenone; and the like; and mixtures thereof.

As the cross-linking initiator of embodiments, any suitable peroxy compound may be used. In particular embodiments, suitable peroxy compounds include but are not limited to, for example, hydrogen peroxide; diacylperoxides, such as decanoyl peroxide, diacetyl peroxide, dibenzoyl peroxide, di-p-chlorobenzoyl peroxide, dilauroyl peroxide; peroxyesters, such as tert-butylperoxy-2-ethylhexanoate and tert-butylperoxy benzoate, tert-butyl peroxyacetate, dicyclohexyl peroxy dicarbonate; hydroperoxides, such as tert-butyl hydroperoxide, cyclohexanone hydroperoxide, tert-amyl hydroperoxide, methylethyl ketone hydroperoxide and cumene hydroperoxide; perketals, such as tert-butyl peroxyneodecanoate, 2,5-dimethyl-2,5-di(2-ethylhexanoyl peroxy) hexane, 1,1-di(tert-butylperoxy)-3,3,5-trimethylcyclohexane and 1,1-di(tert-butylperoxy)-cyclohexane; alkyl peroxides, such as dicumyl peroxide, bis-(tert-butyl peroxybutane) and tert-butylcumyl peroxide; ketone peroxides, such as methyl ethyl ketone peroxide, methyl isobutyl ketone peroxide, acetyl acetone peroxide, 2,4-pentanedione peroxide, azoisobutyrodinitrile and cyclohexanone peroxide; and the like; and mixtures thereof.

As the cross-linking initiator of embodiments, any suitable azo compound likewise may be used. In particular embodiments, suitable azo compounds include but are not limited to, for example, as 2,2'-azobis(4-methoxy-2,4-dimethyl valeronitrile); 2,2'-azobis(2-isobutyronitrile); 2,2'dimethyl 2,2'-azobis(2-methylpropionate); 1,1'-azobis(cyclohexane-1-carbonitrile); 1-((cyano-1-methylethyl)azo) formamide; 2,2'-azobis(N-cyclohexyl-2-methylpropionamide); 2,2'-azobis(2,4-dimethyl valeronitrile); 2,2'-azobis(2-methylbutyronitrile); 2,2'-azobis(N-butyl-2-methylpropionamide); polydimethylsiloxane initiators, such as the VPS-0501 and VPS-1001 available from Wako Pure Chemicals Industry; and polyethylene glycol based initiators, such as the VPE-021, VPE-041, and VPE-061 also available from Wako. In embodiments, the cross-linking initiator is chosen from azo initiators including, for example, 2,2'-azobis(2,4-dimethyl valeronitrile), 2,2'-azobis(2-methylbutyronitrile), 2,2'-azobis(N-butyl-2-methylpropionamide) and 2,2'-azobis(2-isobutyronitrile), and the like, and mixtures thereof.

In some embodiments, the cross-linking initiator may be a blend of initiators that may optionally contain a reactive thermally-activated initiator, such as 2'-azobis[N-(2-propenyl)-2-methylpropionamide], VF-096, Wako Pure Chemicals Industry Ltd., Chuo-Ku, Japan or Wako Chemicals Inc. Richmond, Va.

In embodiments, pre-treatment compositions may comprise from about 75 to about 99%, such as from about 85 to about 97% or from about 90 to about 95%, by weight of the pre-treatment composition, of organic liquids, and from about 0.01 to about 20%, such as from about 3 to about 15% or from about 5 to about 10%, by weight of the pre-treatment composition, of cross-linking initiators. In particular embodiments, the organic liquids may comprise from about 0 to about 100%, such as from about 25 to about 75% or from about 50 to about 65%, by weight of the organic liquids, of one or more branched alkanes and about 100 to about 0%, such as from about 70 to about 20% or from about 30 to about 50%, by weight of the organic liquids, of one or more linear alkanes. In embodiments in which the cross-linking initiator includes an azo initiator in combination with a peroxy initiator, the azo initiator may be present in amounts from about 0.1 to about 50% by weight of the total amount of cross-linking initiator, and in some embodiments from about 1 to about 10% by weight.

Thus, an exemplary pre-treatment composition, shown below, might include a branched alkane, such as 15-ethyl-3,7,19-trimethyl-docosane; a linear alkane, such as n-hexadecane (available as NORPAR from Exxon Corporation); and a cross-linking initiator, such as tert-butyl hydroperoxide (available as LUPEROX TBH90 from Atofina Canada, Oakville, Ontario, Canada).

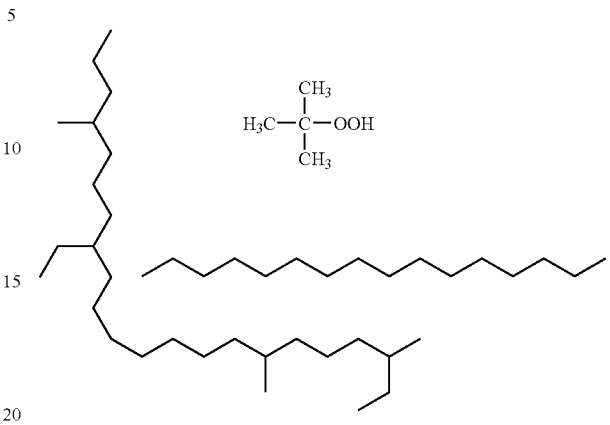

Although described above as containing an organic liquid and a cross-linking initiator, the pre-treatment can consist of these two components, or can comprise these two components in addition to other conventional additives. For example, if desired, the pre-treatment composition may include colorants, solvents, and the like. Optionally, the pre-treatment composition may also contain up to 40% by weight of self-dispersible nanoparticles, such as organic dispersible silica particles available from Nissan Chemicals Industry Limited.

Oil-Based Ink Compositions

Aspects described herein provide ink-jettable, oil-based ink compositions comprising organic liquids, unsaturated organic compounds, colorants, and optional additives.

Embodiments of ink compositions may comprise one or more organic liquids. The organic liquids function as oil-based liquid vehicles for the ink compositions of embodiments. Suitable organic liquids for use in embodiments include $C_6$-$C_{30}$ linear alkanes, such as those available under the trade name NORPAR from Exxon Corporation; $C_6$-$C_{30}$ branched alkanes, such as those available under the trade name ISOPAR from Exxon Corporation; $C_6$-$C_{30}$ linear alkenes and/or $C_6$-$C_{30}$ branched alkenes, and mixtures thereof. Other suitable organic liquids include, for example, the SOLTROL® series available from the Phillips Petroleum Company, and the SHELLSOL® series available from the Shell Oil Company. In particular embodiments, the organic liquids are selected from those that have a low vapor pressure at room temperature and that provide solutions having a viscosity suitable for an ink-jet device, such as from about 1.5 to about 30 centipoise, or from about 2.5 to about 15 centipoise. Specific examples of such suitable organic liquids include, but are not limited to, NORPAR® 12, 13, and 15, available from Exxon Corporation; ISOPAR® G, H, L, and M, available from Exxon Corporation; AMSCO 460 Solvent and AMSCO OMS, available from American Mineral Spirits Company; SOLTROL, available from Phillips Petroleum Company; PAGASOL, available from Mobil Oil Corporation; SHELLSOL, available from Shell Oil Company; and the like.

In embodiments, ink compositions may comprise from about 45 to about 99%, such as from about 85 to about 97% or from about 90 to about 95%, by weight of the ink composition, of organic liquids. In particular embodiments, the organic liquids may comprise from about 0 to about 100%, such as from about 25 to about 75% or from about 50 to about 65%, by weight of the organic liquids, of one or more branched alkanes and about 100 to about 0%, such as from about 70 to about 20% or from about 30 to about 50%, by weight of the organic liquids, of one or more linear alkanes. Linear and branched unsaturated organic liquids may be substituted, in whole or in part, for linear or branched alkanes, to improve image robustness.

Ink compositions of embodiments also comprise one or more unsaturated organic compounds. The unsaturated organic compounds of embodiments may be chosen from unsaturated fatty materials, such as unsaturated fatty materials that include one or more terminal polar functional groups. In embodiments, the unsaturated organic compounds may be linear or branched and may contain one or more double bonds and/or one or more triple bonds. Embodiments may include multiple unsaturated compounds, which may be the same or different from each other, and may contain different numbers of double and/or triple bonds.

Any suitable unsaturated organic material may be used in embodiments, including but not limited to unsaturated fatty materials, such as $C_6$-$C_{30}$ linear alkenes and/or $C_6$-$C_{30}$ branched alkenes, and, in particular, unsaturated fatty materials that include one or more terminal polar functional groups, such as unsaturated linear and branched $C_6$-$C_{30}$ alcohols, amines, acids and acid salts. Any polar functional group may be suitably selected for use as one or more of the terminal polar functional groups of unsaturated fatty materials that include one or more terminal polar functional groups in embodiments. In embodiments, terminal polar functional groups may be chosen from alcohol functional groups, amine functional groups, acid functional groups, acid salts and combinations thereof. That is, each of the unsaturated organic compounds may include one or more terminal polar functional groups, which may be the same or different, and each unsaturated organic compound may have the same or different terminal polar functional groups as any other unsaturated organic compound. Thus, the unsaturated organic compounds may be chosen from unsaturated fatty materials having one or more polar terminal group, such as unsaturated fatty alcohols, unsaturated fatty amines, unsaturated fatty acids, salts of unsaturated fatty acids and mixtures and combinations thereof. In particular embodiments, the unsaturated organic compounds may be one or more compounds chosen from linolenic alcohols, linolic alcohols, oleyl alcohols, linolenic amines, linolic amines, oleyl amines, linolenic acids, linolic acids, oleyl acids, linolenic acid salts, linolic acid salts, oleyl acid salts, and mixtures thereof.

In embodiments, oil-based ink compositions may comprise from about 10 to about 50%, such as from about 15 to about 45% or from about 20 to about 35%, by weight of the ink composition, of unsaturated organic compounds.

Ink compositions of embodiments also comprise one or more colorants. Colorants that may be included in ink compositions of embodiments include pigments, dyes, mixtures of pigments, mixtures of dyes, mixtures of pigments and dyes, and the like. In specific embodiments, the colorants are one or more of pigments and mixtures of pigments.

Any dye or pigment that is capable of being dispersed or substantially dissolved in the oil-based vehicle and is compatible with the other ink components may be included in embodiments. In particular embodiments, oil-based ink compositions may contain magenta colorants, cyan colorants, yellow colorants and/or black colorants, such as those described in U.S. Pat. No. 5,989,325, the disclosure of which is incorporated herein by reference in its entirety. In particular embodiments, the colorants may be dyes, which may be chosen from solvent dyes. In specific embodiments, the dyes are chosen from spirit solvent dyes, which may be particularly compatible with the liquid vehicles of certain ink compositions and pre-treatment compositions. Examples of suitable spirit solvent dyes include those described, for example, in U.S. Pat. No. 5,989,325.

Examples of suitable pigments include Violet Toner VT-8015 (Paul Uhlich), PALIOGEN Violet 5100 (BASF), PALIOGEN Violet 5890 (BASF), Permanent Violet VT 2645 (Paul Uhlich), HELIOGEN Green L8730 (BASF), ARGYLE Green XP-111 -S (Paul Uhlich), Brilliant Green Toner GR 0991 (Paul Uhlich), LITHOL Scarlet D3700 (BASF), TOLUIDINE Red (Aldrich), Scarlet for THERMOPLAST NSD PS PA (Ugine Kuhlmann of Canada), E.D. TOLUIDINE Red (Aldrich), LITHOL Rubine Toner (Paul Uhlich), LITHOL Scarlet 4440 (BASF), BON Red C (Dominion Color Company), Royal Brilliant Red RD-8192 (Paul Uhlich), ORACET Pink RF (Ciba-Geigy), PALIOGEN Red 3871K (BASF), PALIOGEN Red 3340 (BASF), LITHOL Fast Scarlet L4300 (BASF), HELIOGEN Blue L6900, L7020 (BASF), HELIOGEN Blue K6902, K6910 (BASF), HELIOGEN Blue D6840, D7080 (BASF), SUDAN Blue OS (BASF), NEOPEN Blue FF4012 (BASF), PV Fast Blue B2G01 (American Hoechst), IRGALITE Blue BCA (Ciba-Geigy), PALIOGEN Blue 6470 (BASF), SUDAN III (Red Orange), (Matheson, Colemen Bell), SUDAN II (Orange), (Matheson, Colemen Bell), SUDAN Orange G (Aldrich), SUDAN Orange 220 (BASF), PALIOGEN Orange 3040 (BASF), ORTHO Orange OR 2673 (Paul Uhlich), PALIOGEN Yellow 152, 1560 (BASF), LITHOL Fast Yellow 0991K (BASF), PALIOTOL Yellow 1840 (BASF), NOVOPERM Yellow FGL (Hoechst), Permanent Yellow YE 0305 (Paul Uhlich), LUMOGEN Yellow D0790 (BASF), SUCO Yellow L1250 (BASF), SUCO Yellow D1355 (BASF), SUCO Fast Yellow D1355, D1351 (BASF), HOSTAPERM Pink E (American Hoechst), FANAL Pink D4830 (BASF), CINQUASIA Magenta (Du Pont), PALIOGEN Black L0084 (BASF), Pigment Black K801 (BASF), and carbon blacks such as REGAL 330® (Cabot), Carbon Black 5250, Carbon Black 5750 (Columbia Chemical Company).

In embodiments, oil-based ink compositions may comprise from about 1 to about 25%, such as from about 2 to about 15% or from about 3 to about 10%, by weight of the ink composition, of colorants.

Oil-based ink compositions according to embodiments may also include optional additives. Any suitable additive used in ink-jettable compositions may be included. In embodiments, additives include one or more of drying agents, surfactants, biocides, UV absorbers, antioxidants, and the like.

In particular, oil-based ink compositions of embodiments may also optionally comprise one or more drying agents. As the drying agent of embodiments, use may be made, for example, of metal salts, heavy metal salts and organic drying compounds. Any suitable metal salts may be used in embodiments. Suitable metal salts include metal salt driers of the type used to catalyze the drying rate of lithographic printing ink compositions. The metal salts may be present either in the form of unsaturated fatty acid salt pigment dispersants or as additional components added to the oil-based ink compositions of embodiments. In embodiments, the metal salt drying agents include metals such as cobalt, manganese, lead, zirconium, calcium, barium, strontium, zinc, and combinations and/or mixtures thereof. Specific embodiments may include metal salts such as manganese stearate.

In embodiments, the metal salt drying agents may be heavy metal salts of carboxylic acids, such as vanadium, iron, manganese naphthalates and octoates, and, in particular embodiments, cobalt naphthalates and octoates. In addition, organic drying compounds, such as dialkyl aryl amines, such as dimethyl anilines and diethyl anilines, which may be para-substituted with organic groups such as phenyl, methyl methoxy, hydroxyl or amino groups. Mixtures of two or more metal salt drying agents may be used in embodiments. The metal salt drying agents of embodiments may also act with cross-linking initiators of pre-treatment compositions to promote cross-linking reactions.

In particular embodiments, mixtures of metal salts that initiate drying differently and/or accelerate the drying process of other metal salts may be used. For example, manganese is a bottom—or through—drier, drying within the film while cobalt is a top drier, drying the surface of the film. Zirconium is a weak drier that acts as an accelerant dor cobalt and manganese driers.

In embodiments, oil-based ink compositions may comprise from about 0 to about 25%, such as from about 2 to about 15% or from about 3 to about 5%, by weight of the ink composition, of metal salt drying agents.

Exemplary oil-based ink compositions, such as that illustrated below, may include branched and linear alkanes; unsaturated organic acid salts, such as cobalt salts of linolenic acid and cobalt salts of linolic acid; and pigments.

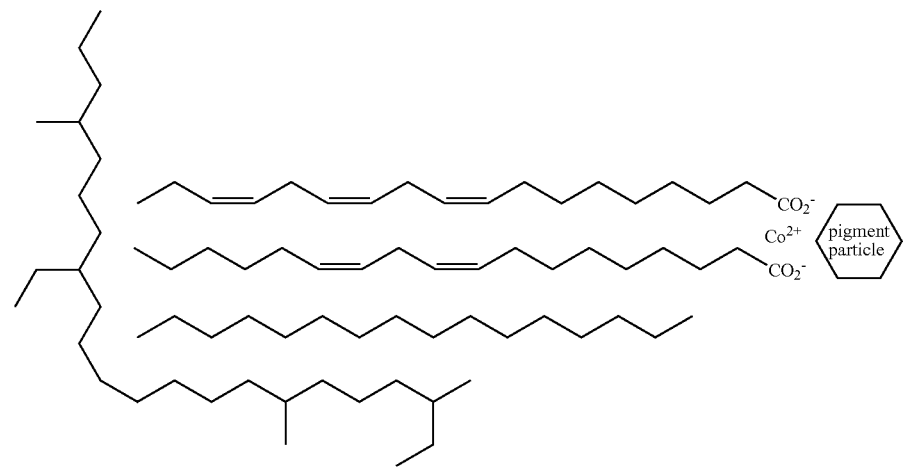

Other exemplary ink compositons, such as that illustrated below, may include branched and linear alkanes; unsaturated organic alcohols, such as linolenic alcohol and linolic alcohol; pigments and metal salts, such as manganese stearate.

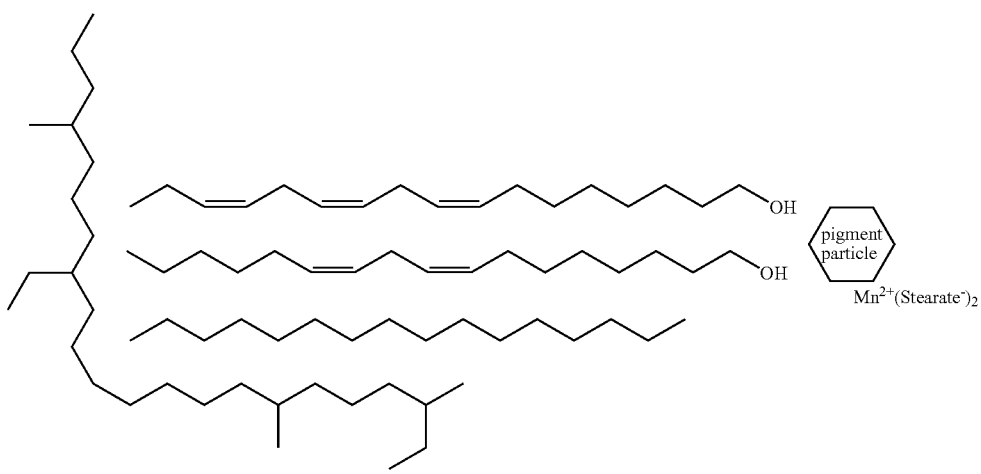

Ink Sets

Ink sets of embodiments include one or more pre-treatment compositions and one or more oil-based ink compositions. In particular embodiments, the ink sets include one or more pre-treatment compositions as described above and/or one or more oil-based ink compositions as described above. That is, in some embodiments, the pre-treatment composition and the ink compositions described above can be used in combination in an ink set. In these embodiments, the components of the pre-treatment composition and the ink composition can be suitably selected to interact with each other, to promote faster drying and decreased lateral and/or vertical movement of the colorant in the ink composition after it is deposited on the print substrate. However, it will be appreciated that the above-described pre-treatment composition and ink compositions can be separately used with other conventional components, such as a combination of the above pre-treatment composition and a conventional ink composition or the combination of a conventional (or even no) pre-treatment composition and the above ink composition, if desired.

In particular embodiments, the ink sets comprise one or more pre-treatment compositions, and one or more oil-based ink compositions including one or more magenta colorants, one or more oil-based ink compositions including one or more cyan colorants, one or more oil-based ink compositions including one or more yellow colorants and/or one or more oil-based ink compositions including one or more black colorants. In such embodiments, the pre-treatment composition and each oil-based ink composition may be individually and separately provided to separate ink jets. Separation of pre-treatment compositions and oil-based ink compositions permits premature cross-linking of unsaturated organic compounds to be avoided.

While any combination of exemplary embodiments of pre-treatment compositions and exemplary embodiments of ink compositions may be used together, in particular embodiments, the pre-treatment composition may be used in ink sets including ink compositions having the same vehicle as that of the pre-treatment composition.

According to embodiments, any suitable ink-jet printer can be used, in combination with the pre-treatment compositions, oil-based ink compositions and/or ink sets described herein. Suitable printers are disclosed, for example, in the above-referenced U.S. Pat. Nos. 5,738,716, 5,788,754, 5,805,190, 5,858,075, 5,864,350, 5,917,509, 5,931,995, and 5,989,325, the entire disclosures of which are incorporated herein by reference.

Ink-Jet Recording

Ink-jet recording in accordance with embodiments comprises depositing one or more pre-treatment compositions on a substrate, and depositing one or more oil-based ink compositions onto the pre-treated substrate. The pre-treatment compositions are delivered or deposited by jets that are separate from those used to deliver or deposit ink compositions. This separation permits prevention of premature ink cross-linking within the printhead.

Substrates that may be used for embodiments of ink-jet recording processes include plain and treated papers, fabrics, and other porous substances.

In embodiments, one or more pre-treatment compositions are delivered to the substrates prior to the delivery of one or more oil-based ink compositions. This pre-treatment allows cross-linking of unsaturated organic compounds to begin immediately on ink delivery. Cross-linking immobilizes pigment particles, preventing pigment spreading. This allows high quality images to be obtained, with little or no edge spreading and/or with little or no image show through.

In embodiments, the pre-treatment compositions are deposited on the substrate prior to image formation. The pre-treatment compositions may be deposited over an entire substrate surface, such as to coat one side of a paper substrate in its entirety, or the pre-treatment compositions may be deposited in an image-wise fashion, such as to only those areas to which oil-based ink compositions will be subsequently applied. When applied in an image-wise manner, the pre-treatment composition can be applied such that it corresponds substantially to the subsequently applied ink image, or the pre-treatment can be applied to form a larger or smaller area than the subsequently applied ink image.

Applying pre-treatment compositions to substrates prior to recording an image with oil-based ink compositions allows improved quality images to be obtained, due to the immobilization of colorants in the ink compositions. Cross-linking initiators in exemplary pre-treatment compositions are catalytically activated by metal salts in exemplary ink compositions, causing cross-linking polymerization of unsaturated organic compounds around colorant particles. This cross-linking forms a network that prevents colorant particles from moving through pores in the substrate. Thus immobilized colorant particles are prevented from spreading laterally, which allows sharp images to be obtained, and immobilized colorant particles are prevented from spreading vertically, which allows show-through to be prevented. After the initial network is formed, the organic liquids, or oil-based materials in the ink compositions, may spread through the substrate without carrying colorant particles. In addition, the cross-linking polymerization of the unsaturated organic compounds continues beyond the initial network, and very robust images of colorant particles embedded in a cross-linked film can be obtained. In some embodiments, the pre-treatment compositions may be gelled, thereby immobilizing colorant particles, and subsequently cured by a suitable mechanism, including but not limited to heat curing.

For example, cross-linking reactions may immobilize colorant particles as follows. Metal salts, such as cobalt salts, catalyze decomposition of cross-linking initiators, such as tert-butyl hydroperoxide, by oxidation-reduction reactions as shown in reactions (1) and (2). This catalytic decomposition of the initiator requires no heating, unlike conventional thermal activation, and is very energy efficient.

$$Co^{2+}+(CH_3)_3COOH \rightarrow (CH_3)_3CO \cdot + OH^- + Co^{3+} \quad (1)$$

$$Co^{3+}+(CH_3)_3COOH \rightarrow (CH_3)_3COO \cdot + H^+ + Co^{2+} \quad (2)$$

The free radicals that are formed then begin abstraction of the most readily attacked hydrogens between two double bonds.

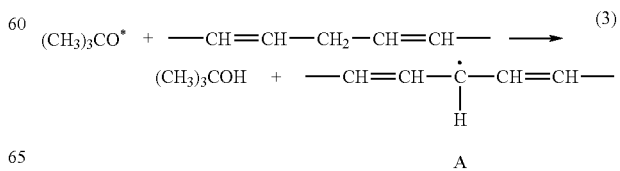

The resulting free radicals (A) will rearrange into more stable, conjugated form, such as (B).

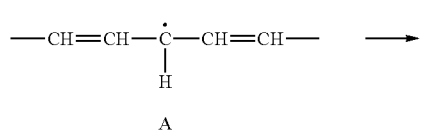

(4)

The conjugated free radicals (B), which may more generally be designated by R., react with other free radicals R., according to (5).

$$R. + R. \rightarrow R-R \quad (5)$$

Linolenic and linolic acid each have carbon chains that include 18 carbon atoms and that do not increase to 19 carbon atoms in length as a result of the cross-linking reactions. As can be seen from equations (3) and (4), cross-linking sites are determined by hydrogen abstraction, not by double-bond opening. In addition, double bonds of linolenic and linolic acids are positionally rearranged but are conserved in number. These cross-linked systems trap and immobilize colorants, such as pigment particles, as can be seen in the exemplary idealized schematic below.

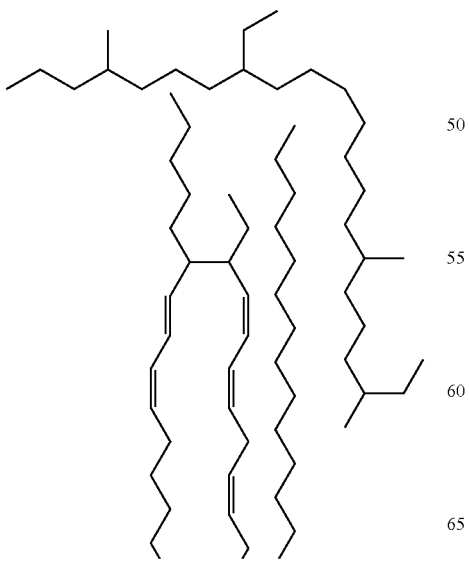

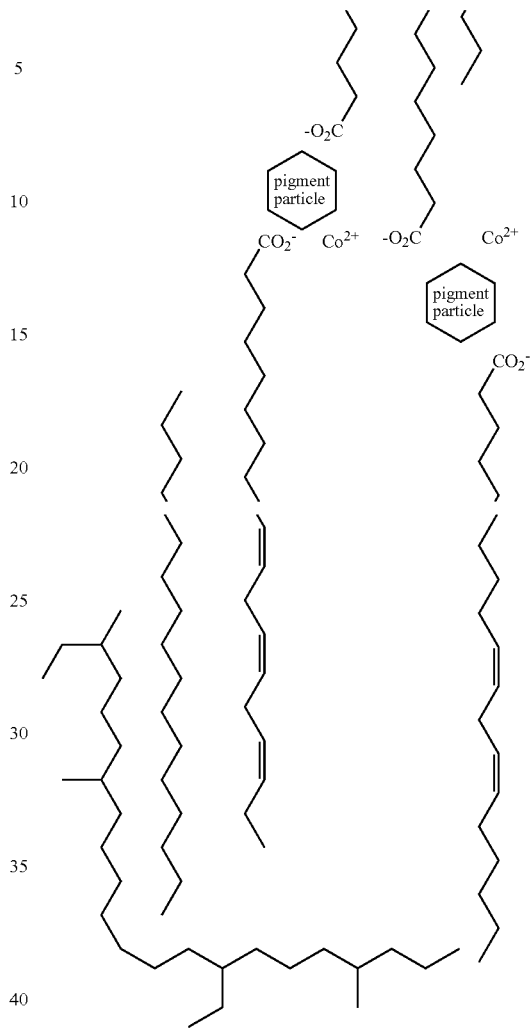

In addition, as the substrate surface absorbs oxygen, conjugated free radicals (B) can also react with oxygen to form the peroxy free radical (C), which can more generally be designated ROO..

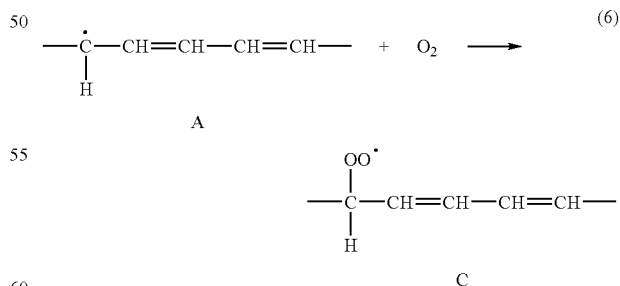

(6)

The peroxy free radicals can abstract hydrogens from methylene groups between double bonds to form hydroperoxides and additional free radicals. The hydroperoxide formed by hydrogen extraction can generally be designated ROOH. The decomposition of these hydroperoxides can again be catalyzed by the metal salts. The decomposition products may be generally designated RO. and OH..

$$ROOH \rightarrow RO. + HO. \qquad (7)$$

$$RO. + R. \rightarrow R-O-R \qquad (8)$$

$$RO. + RO. \rightarrow R-O-O-R \qquad (9)$$

Thus a chain reaction is established resulting in auto-oxidation. The free radicals serve to cross-link the unsaturated compounds on the substrate, and thereby ensure pigment immobilization and provide robust images.

Specific examples are described in detail below. These examples are intended to be illustrative, and the materials, conditions, and process parameters set forth in these exemplary embodiments are not limiting. All parts and percentages are by weight unless otherwise indicated.

EXAMPLES

Example 1

Carbon Black Pigment Concentrate

A stable carbon black concentrate in dibutyl sebacate, available from Morflex Inc. NC, is obtained as follows:

In a 1 liter, stainless steel beaker attached to a DISPERMAT FT (available from VMA-Getzmann GMBH) equipped with a 40 mm high-shear mixing dissolver set between an initial speed of 1500 and a final speed of 2500 rpm, 133.33 g of REGAL 660 carbon black (available from Cabot) is added slowly with high-shear mixing to a solution of 100 g of SOLSPERSE 13940 (40% active, available from Avecia), in 100.18 g of dibutyl sebacate (available from Morflex Inc.). The dispersion is continuously stirred under these conditions for a period of 2 hours after the addition of the carbon black. The loading of dispersant to carbon black is estimated at about 2.6 mg/m², providing optimum conditions for stability.

This dispersion is further processed for 270 minutes in a DISPERMAT SL-C 12 (available from VMA-Getzmann GMBH), under the following conditions: speed =2000 rpm; temperature =30-55° C. (water cooled); circulation rate =~3 g/s through a 125 ml chamber; amount of milling beads =100 ml; type of beads =0.8-1.0 zirconium-silicon dioxide. The maximum particle size of the resulting carbon black dispersion is found to be less than 200 nm, with a mean particle size of about 80 nm, under the above experimental conditions and as measured with a MICROTRAC UPA 150.

Example 2

Concentrate of Pigment Red 57-1

A stable Pigment Red 57-1 (available from Sun Chemicals) concentrate in dibutyl sebacate (available from Morflex Inc.) is obtained as follows:

In a 500 ml stainless steel beaker attached to a DISPERMAT FT (available from VMA-Getzmann GMBH) equipped with a 40 mm high-shear mixing dissolver set between an initial speed of 1500 and a final speed of 2500 rpm, 50.09 g of Pigment Red 57-1 (available from Sun Chemicals) is added slowly with high-shear mixing to a solution of 28.37 g of SOLSPERSE 13940 (40% active, available from Avecia), in 47.19 g of dibutyl sebacate (available from Morflex Inc.). The dispersion is continuously stirred under these conditions for a period of 2 hours after the addition of the pigment. The loading of dispersant to Pigment Red 57-1 is estimated at about 2.6 mg/m², providing optimum conditions for stability.

This dispersion is further processed for 210 minutes in a DISPERMAT SL-C 12 (available from VMA-Getzmann GMBH), under the following conditions: speed =2000 rpm; temperature =30-55° C. (water cooled); circulation rate =~3 g/s through a 125 ml chamber; amount of milling beads =100 ml; type of beads =0.8-1.0 zirconium-silicon dioxide. The maximum particle size of the resulting Pigment Red 57-1 dispersion is found to be less than 240 nm, with a mean particle size of about 60 nm, under the above experimental conditions and as measured with a MICROTRAC UPA 150.

Example 3

Concentrate of Pigment Red 122

A stable Pigment Red 122 (Quindo Magenta, available from Bayer) concentrate in dibutyl sebacate (available from Morflex Inc.) is obtained as follows:

In a 500 ml stainless steel beaker attached to a DISPERMAT FT (available from VMA-Getzmann GMBH) equipped with a 40 mm high-shear mixing dissolver set between an initial speed of 1500 and a final speed of 2500 rpm, 22.50 g of Pigment Red 122 (available from Bayer) is added slowly with high-shear mixing to a solution of 67.88 g of SOLSPERSE 13940 (40% active, available from Avecia), in 75.12 g of dibutyl sebacate (available from Morflex Inc.). The dispersion is continuously stirred under these conditions for a period of 2 hours after the addition of the pigment. The loading of dispersant to Pigment Red 122 is estimated at about 10.0 mg/m², providing optimum conditions for stability.

This dispersion is further processed for 150 minutes in a DISPERMAT SL-C 12 (available from VMA-Getzmann GMBH), under the following conditions: speed =2000 rpm; temperature =30-55° C. (water cooled); circulation rate =~3 g/s through a 125 ml chamber; amount of milling beads =100 ml; type of beads =0.8-1.0 zirconium-silicon dioxide. The maximum particle size of the resulting Pigment Red 122 dispersion is found to be less than 240 nm, with a mean particle size of about 60 nm, under the above experimental conditions and as measured with a MICROTRAC UPA 150.

The pigment concentrates of Examples 1-3 are suitable for formulating the ink compositions of embodiments. Suitable pigment concentrates can also be prepared by the processes such as those described in U.S. Pat. No. 6,166,105 and in U.S. patent application No. 2001/0008909, the disclosures of which are incorporated herein by reference in their entirety.

Example 5

Cobalt Salt of Linolenic Acid

The cobalt salt of linolenic acid may be obtained by direct electrochemical synthesis, as described by Kumar, N. et al., Canadian Journal of Chemistry (1987), 65(4), 740-3. In particular, 0.1 g of linolenic acid is dissolved in 50 mL acetone containing 0.04 g of $Et_2NClO_4$. This solution is added to prepare simple electrochemical cells of the form $$Pt^{(-)}/CH_3CN + \text{linolenic acid}/Co^{(++)}$$

and an initial voltage of 25 V is applied for 45 minutes. The cobalt (II) linolenic acid salt precipitates directly during electrochemical oxidation.

Alternatively, the cobalt salt of linolenic acid may be prepared by a precipitation process including adding the water-soluble cobalt sulphate to a hot sodium salt solution of the linolenic acid with agitation until precipitation is complete. The resulting salt is washed and dried by conventional methods. Cobalt salts of linolic acids may be similarly obtained by these methods.

Examples 5-12

Carbon Black Ink Compositions

Exemplary ink compositions, Examples 5-8 are prepared by first dispersing carbon black concentrate into a vehicle, adding manganese stearate (available from Pechiney World Trade Inc.), and adding unsaturated fatty acids, linolic and linolenic acids (available from Cayman Chemical), optionally in a peroxide-free grade. Table 1 sets forth the specific compositions of Examples 5-8.

Exemplary ink compositions, Examples 9-12, are prepared in the same manner as the exemplary ink compositions of Examples 5-8, except that the manganese stearate is replaced by other metal salts. Table 1 sets forth the specific compositions of Examples 9-12.

Examples 13-28

Colored Ink Compositions

Exemplary ink compositions, Examples 13-28, are prepared in the same manner as the exemplary ink compositions of Examples 5-12, with the exception that the carbon black is replaced by corresponding amounts of the pigment concentrations of Examples 2 and 3, respectively. Table 2 sets forth the specific compositions of Examples 13-20, which include the pigment concentration of Example 2; Table 3 sets forth the specific compositions of Examples 21-28, which include the pigment concentration of Example 3.

Examples 29-35

Pre-Treatment Compositions

Exemplary ink-jettable pre-treatment compositions, Examples 29-35 are prepared by adding tert-butyl hydroperoxide (LUPEROX TBH90, available from Arkema) and/or azo initiators to a vehicle. Table 4 sets forth the specific compositions of Examples 29-35.

TABLE 1

| | Vehicle | | | | | | | | | |
|---|---|---|---|---|---|---|---|---|---|---|
| | Linear Alkane | | Branched Alkane | | Unsaturated Fatty Acid | | | | Metal Salt | | Colorant | |
| Example | Type | Wt % | Type | Wt % | Type | Wt % | Type | Wt % | Type | Wt % | Type | Wt % |
| 5 | n-hexadecane (Aldrich) | 20 | ISOPAR V (EXXON) | 22.5 | Linolenic Acid | 22.5 | Linolic Acid | 22 | Manganese Stearate | 3 | Example 1 | 10 |
| 6 | NORPAR 15 (EXXON) | 27.5 | ISOPAR V (EXXON) | 17.5 | Linolenic Acid | 12.5 | Linolic Acid | 30 | Manganese Stearate | 0.5 | Example 1 | 12 |
| 7 | NORPAR 15 (EXXON) | 7 | ISOPAR L (EXXON) | 12 | Linolenic Acid | 19 | Linolic Acid | 55 | Manganese Stearate | 2 | Example 1 | 5 |
| 8 | n-hexadecane (Aldrich) | 12 | SHELLSOL T (Shell) | 15.9 | Linolenic Acid | 18.1 | Linolic Acid | 45 | Manganese Stearate | 2 | Example 1 | 7 |
| 9 | n-hexadecane (Aldrich) | 20 | ISOPAR V (EXXON) | 22.5 | Linolenic Acid | 20 | Linolic Acid | 24.5 | ADDITOL VXW 6206 (Solutia Inc.) | 3 | Example 1 | 10 |
| 10 | NORPAR 15 (EXXON) | 27.5 | ISOPAR V (EXXON) | 17.5 | Linolenic Acid | 20 | Linolic Acid | 22 | ADDITOL VXW 6207 (Solutia Inc.) | 3 | Example 1 | 10 |
| 11 | NORPAR 15 (EXXON) | 7 | ISOPAR L (EXXON) | 12 | Linolenic Acid | 20 | Linolic Acid | 49 | Cobalt salt of linolic acid (Example 4) | 2 | Example 1 | 10 |
| 12 | n-hexadecane (Aldrich) | 12 | SHELLSOL T (Shell) | 15.9 | Linolenic Acid | 20 | Linolic Acid | 40.1 | Cobalt salt of linolic acid (Example 4) | 2 | Example 1 | 10 |

TABLE 2

| | Vehicle | | | | | | | | | |
|---|---|---|---|---|---|---|---|---|---|---|
| | Linear Alkane | | Branched Alkane | | Unsaturated Fatty Acid | | | | Metal Salt | | Colorant | |
| Example | Type | Wt % | Type | Wt % | Type | Wt % | Type | Wt % | Type | Wt % | Type | Wt % |
| 13 | n-hexadecane (Aldrich) | 20 | ISOPAR V (EXXON) | 22.5 | Linolenic Acid | 22.5 | Linolic Acid | 22 | Manganese Stearate | 3 | Example 2 | 10 |
| 14 | NORPAR 15 (EXXON) | 27.5 | ISOPAR V (EXXON) | 17.5 | Linolenic Acid | 12.5 | Linolic Acid | 30 | Manganese Stearate | 0.5 | Example 2 | 12 |
| 15 | NORPAR 15 (EXXON) | 7 | ISOPAR L (EXXON) | 12 | Linolenic Acid | 19 | Linolic Acid | 55 | Manganese Stearate | 2 | Example 2 | 5 |
| 16 | n-hexadecane (Aldrich) | 12 | SHELLSOL T (Shell) | 15.9 | Linolenic Acid | 18.1 | Linolic Acid | 45 | Manganese Stearate | 2 | Example 2 | 7 |
| 17 | n-hexadecane (Aldrich) | 20 | ISOPAR V (EXXON) | 22.5 | Linolenic Acid | 20 | Linolic Acid | 24.5 | ADDITOL VXW 6206 (Solutia Inc.) | 3 | Example 2 | 10 |

TABLE 2-continued

| | Vehicle | | | | | | | | | |
|---|---|---|---|---|---|---|---|---|---|---|
| | Linear Alkane | | Branched Alkane | | Unsaturated Fatty Acid | | | | Metal Salt | | Colorant | |
| Example | Type | Wt % | Type | Wt % | Type | Wt % | Type | Wt % | Type | Wt % | Type | Wt % |
| 18 | NORPAR 15 (EXXON) | 27.5 | ISOPAR V (EXXON) | 17.5 | Linolenic Acid | 20 | Linolic Acid | 22 | ADDITOL VXW 6207 (Solutia Inc.) | 3 | Example 2 | 10 |
| 19 | NORPAR 15 (EXXON) | 7 | ISOPAR L (EXXON) | 12 | Linolenic Acid | 20 | Linolic Acid | 49 | Cobalt salt of linolic acid (Example 4) | 2 | Example 2 | 10 |
| 20 | n-hexadecane (Aldrich) | 12 | SHELLSOL T (Shell) | 15.9 | Linolenic Acid | 20 | Linolic Acid | 40.1 | Cobalt salt of linolic acid (Example 4) | 2 | Example 2 | 10 |

TABLE 3

| | Vehicle | | | | | | | | | |
|---|---|---|---|---|---|---|---|---|---|---|
| | Linear Alkane | | Branched Alkane | | Unsaturated Fatty Acid | | | | Metal Salt | | Colorant | |
| Example | Type | Wt % | Type | Wt % | Type | Wt % | Type | Wt % | Type | Wt % | Type | Wt % |
| 21 | n-hexadecane (Aldrich) | 20 | ISOPAR V (EXXON) | 22.5 | Linolenic Acid | 22.5 | Linolic Acid | 22 | Manganese Stearate | 3 | Example 3 | 10 |
| 22 | NORPAR 15 (EXXON) | 27.5 | ISOPAR V (EXXON) | 17.5 | Linolenic Acid | 12.5 | Linolic Acid | 30 | Manganese Stearate | 0.5 | Example 3 | 12 |
| 23 | NORPAR 15 (EXXON) | 7 | ISOPAR L (EXXON) | 12 | Linolenic Acid | 19 | Linolic Acid | 55 | Manganese Stearate | 2 | Example 3 | 5 |
| 24 | n-hexadecane (Aldrich) | 12 | SHELLSOL T (Shell) | 15.9 | Linolenic Acid | 18.1 | Linolic Acid | 45 | Manganese Stearate | 2 | Example 3 | 7 |
| 25 | n-hexadecane (Aldrich) | 20 | ISOPAR V (EXXON) | 22.5 | Linolenic Acid | 20 | Linolic Acid | 24.5 | ADDITOL VXW 6206 (Solutia Inc.) | 3 | Example 3 | 10 |
| 26 | NORPAR 15 (EXXON) | 27.5 | ISOPAR V (EXXON) | 17.5 | Linolenic Acid | 20 | Linolic Acid | 22 | ADDITOL VXW 6207 (Solutia Inc.) | 3 | Example 3 | 10 |
| 27 | NORPAR 15 (EXXON) | 7 | ISOPAR L (EXXON) | 12 | Linolenic Acid | 20 | Linolic Acid | 49 | Cobalt salt of linolic acid (Example 4) | 2 | Example 3 | 10 |
| 28 | n-hexadecane (Aldrich) | 12 | SHELLSOL T (Shell) | 15.9 | Linolenic Acid | 20 | Linolic Acid | 40.1 | Cobalt salt of linolic acid (Example 4) | 2 | Example 3 | 10 |

TABLE 4

| | Vehicle | | | | Cross-Linking Initiator | | | |
|---|---|---|---|---|---|---|---|---|
| | Linear Alkane | | Branched Alkane | | | | | |
| Example | Type | Wt % | Type | Wt % | Peroxy Type | Wt % | Azo Type | Wt % |
| 29 | n-hexadecane (Aldrich) | 40 | ISOPAR V (EXXON) | 45 | Tert-butyl hydroperoxide (LUPEROX TBH90) | 15 | | N/A |
| 30 | NORPAR 15 (EXXON) | 55 | ISOPAR V (EXXON) | 35 | Tert-butyl hydroperoxide (LUPEROX TBH90) | 10 | | N/A |
| 31 | NORPAR 15 (EXXON) | 35 | ISOPAR L (EXXON) | 60 | Tert-butyl hydroperoxide (LUPEROX TBH90) | 5 | | N/A |
| 32 | n-hexadecane (Aldrich) | 40 | SHELLSOL T (Shell) | 53 | Tert-butyl hydroperoxide (LUPEROX TBH90) | 7 | | N/A |
| 33 | NORPAR 15 (EXXON) | 35 | ISOPAR L (EXXON) | 60 | | N/A | 2,2'-azobis(N-butyl-2-methylpropionamide (Wako) | 1 |
| 34 | n-hexadecane (Aldrich) | 40 | SHELLSOL T (Shell) | 53 | Tert-butyl hydroperoxide (LUPEROX TBH90) | 7 | 2,2'-azobis(N-butyl-2-methylpropionamide (Wako) | 0.5 |
| 35 | NORPAR 15 (EXXON) | 55 | ISOPAR V (EXXON) | 35 | Tert-butyl hydroperoxide (LUPEROX TBH90) | 10 | 2,2'-azobis(N-butyl-2-methylpropionamide (Wako) | 0.1 |

It will be appreciated that various of the above-discussed and other features and functions, or alternatives thereof, may be desirably combined into many other different systems or applications. Also various presently unforeseen or unanticipated alternatives, modifications, variations or improvements therein may be subsequently made by those skilled in the art which are also intended to be encompassed by the following claims.

What is claimed is:

1. An ink set for ink-jet recording comprising one or more pre-treatment compositions and one or more oil-based ink compositions, wherein
one or more of the pre-treatment compositions comprise one or more organic liquids, which are one or more liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; and one or more cross-linking initiators, which are one or more compounds chosen from the group consisting of peroxy compounds;
one or more of the oil-based ink compositions comprises one or more organic liquids, which are one or more liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; one or more unsaturated organic compounds; and one or more colorants; and
the one or more unsaturated organic compounds are one or more chosen from unsaturated fatty materials.

2. The ink set according to claim 1, wherein the unsaturated fatty materials are one or more chosen from unsaturated fatty materials having one or more terminal polar groups.

3. The ink set according to claim 1, wherein the cross-linking initiator is one or more peroxy compounds chosen from the group consisting of diacylperoxides, peroxyesters, hydroperoxides, perketals, alkyl peroxides, ketone peroxides, and mixtures thereof.

4. The ink set according to claim 1, wherein the terminal polar functional groups are one or more functional groups chosen from the group consisting of alcohol functional groups, amine functional groups, acid functional groups, acid salts and combinations thereof.

5. The ink set according to claim 1, wherein the one or more unsaturated organic compounds are one or more chosen from unsaturated fatty alcohols, unsaturated fatty amines, unsaturated fatty acids, salts of unsaturated fatty acids and mixtures and combinations thereof.

6. The ink set according to claim 1, wherein the one or more unsaturated organic compounds are one or more chosen from linolenic alcohols, linolic alcohols, oleyl alcohols, linolenic amines, linolic amines, oleyl amines, linolenic acids, linolic acids, oleyl acids, linolenic acid salts, linolic acid salts, oleyl acid salts, and mixtures thereof.

7. The ink set according to claim 1, wherein the colorants are one or more colorants chosen from the group consisting of pigments and mixtures thereof.

8. The ink set according to claim 1, further comprising one or more drying agents.

9. A process for ink-jet recording comprising
depositing one or more pre-treatment compositions on a substrate; and
depositing one or more oil-based ink compositions on the pre-treated substrate; wherein
one or more of the pre-treatment compositions comprise one or more organic liquids, which are one or more liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; and one or more cross-linking initiators, which are one or more compounds chosen from the group consisting of peroxy compounds;
one or more of the oil-based ink compositions comprises one or more organic liquids, which are one or more liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof; one or more unsaturated organic compounds; and one or more colorants; and
the one or more unsaturated organic compounds are one or more chosen from unsaturated fatty materials.

10. The process according to claim 9, wherein the unsaturated fatty materials are one or more chosen from unsaturated fatty materials having one or more terminal polar groups.

11. The process according to claim 9, wherein the cross-linking initiator is one or more peroxy compounds chosen from the group consisting of diacylperoxides, peroxyesters, hydroperoxides, perketals, alkyl peroxides, ketone peroxides, and mixtures thereof.

12. The process according to claim 9, wherein the terminal polar functional groups are one or more functional groups chosen from the group consisting of alcohol functional groups, amine functional groups, acid functional groups, acid salts and combinations thereof.

13. The process according to claim 9, wherein the one or more unsaturated organic compounds are one or more chosen from unsaturated fatty alcohols, unsaturated fatty amines, unsaturated fatty acids, salts of unsaturated fatty acids and mixtures and combinations thereof.

14. The process according to claim 9, wherein the one or more unsaturated organic compounds are one or more chosen from linolenic alcohols, linolic alcohols, oleyl alcohols, linolenic amines, linolic amines, oleyl amines, linolenic acids, linolic acids, oleyl acids, linolenic acid salts, linolic acid salts, oleyl acid salts, and mixtures thereof.

15. The process according to claim 9, wherein the colorants are one or more colorants chosen from the group consisting of pigments and mixtures thereof.

16. The process according to claim 9, further comprising one or more drying agents.

17. The process according to claim 16, wherein the drying agents are one or more metal salts, heavy metal salts, organic drying compounds and mixtures thereof.

18. The process according to claim 9, further comprising reacting the cross-linking initiators with the unsaturated organic compounds and thereby immobilizing the colorant.

* * * * *

UNITED STATES PATENT AND TRADEMARK OFFICE
CERTIFICATE OF CORRECTION

PATENT NO. : 7,531,033 B2 Page 1 of 1
APPLICATION NO. : 11/289573
DATED : May 12, 2009
INVENTOR(S) : Gregory J. Kovacs et al.

It is certified that error appears in the above-identified patent and that said Letters Patent is hereby corrected as shown below:

Column 16, line 51, please change "Example 5" to --Example 4--.

Signed and Sealed this

Twenty-third Day of November, 2010

David J. Kappos
*Director of the United States Patent and Trademark Office*